United States Patent [19]

Mizuno et al.

[11] Patent Number: 4,695,358

[45] Date of Patent: Sep. 22, 1987

[54] METHOD OF REMOVING $SO_2$, $NO_X$ AND PARTICLES FROM GAS MIXTURES USING STREAMER CORONA

[75] Inventors: Akira Mizuno, Toyohashi, Japan; Judson S. Clements, Tallahassee, Fla.

[73] Assignee: Florida State University, Tallahassee, Fla.

[21] Appl. No.: 796,268

[22] Filed: Nov. 8, 1985

[51] Int. Cl.$^4$ .......................................... C01B 17/60
[52] U.S. Cl. ................................... 204/174; 204/179; 55/2
[58] Field of Search ..................... 204/164, 174, 179; 55/2

[56] References Cited

U.S. PATENT DOCUMENTS

| | | | |
|---|---|---|---|
| 2,000,017 | 5/1935 | Heinrich et al. | 55/139 |
| 2,509,548 | 5/1950 | White | 55/139 |
| 3,960,687 | 1/1976 | Bakke et al. | 204/164 |
| 4,313,739 | 2/1982 | Douglas-Hamilton | 204/164 |

FOREIGN PATENT DOCUMENTS

| | | | |
|---|---|---|---|
| 1908685 | 9/1970 | Fed. Rep. of Germany | 204/164 |
| 50-01968 | 1/1975 | Japan | 204/179 |

OTHER PUBLICATIONS

Matteson et al, Current Research, vol. 6, No. 10 (10/72), pp. 895–901.

Tamaki et al, Chem. Soc. of Japan, vol. 11, p. 1582 (1979).

Ootsuka, *Electrical Method of Integrated Pollution Control for Combustion Gases*, PHD Dissertation, Dept. of Electrical Engineering, Univ. of Tokyo (1984).

Mizuno et al, Conf. Rec. of IEEE/IAS, Annual Meeting, Chicago, Ill., p. 1015 (Oct. 1984).

*Primary Examiner*—John F. Niebling
*Attorney, Agent, or Firm*—Clarke, Dennis P.

[57] ABSTRACT

A method for converting sulfur dioxide and/or nitrogen oxide gases to acid mist and or particle aerosols is disclosed in which the gases are passed through a streamer corona discharge zone having electrodes of a wire-cylinder or wire-plate geometry.

49 Claims, 8 Drawing Figures (A) PULSE ON PERIOD
(B) PULSE OFF PERIOD
PULSE WIDTH: 200ns
PULSE FREQUENCY: 60Hz
PULSE VOLTAGE: +40 ~ +45kV
DC VOLTAGE: ADJUSTABLE

METHOD OF REMOVING $SO_2$, $NO_X$ AND PARTICLES FROM GAS MIXTURES USING STREAMER CORONA

This invention was made with Goverment support under contract No. (DE-AC 22-83PC60266) awarded by the Department of Energy. The Government has certain rights in this invention.

BACKGROUND OF THE INVENTION

1. Field of Invention

The present invention relates to a method for removing sulfur dioxide and nitrogen oxides and particulate matter from gas mixtures.

2. Prior Art

Effluent gases containing sulfur dioxide, and/or nitrogen oxides, and/or particulate matter are generated from many sources including coal-burning power plants, iron and steel plants, paper mills, sulfuric, nitric, and other acid production plants, internal combustion engines, and the like. These pollutants may contribute to the formation of photochemical smog and acid rain, and are also harmful to the human body when inhaled. Many processes have been developed for the removal of these pollutants from the effluent gas before they are released to the atmosphere. For example, many coal-burning electric power utilities utilize wet or dry scrubbers for $SO_2$ removal and cyclones, electrostatic precipitators, or bag filters for the removal of particulate matter. However, the methods are capital intensive and costly to operate. The nitrogen oxides (hereinafter referred to as $NO_x$) are particularly difficult to remove and in many cases the $NO_x$ production is only minimized by adjusting the operational parameters of the effluent gas producing facility. Some plants burn low sulfur coal to reduce the $SO_2$ emissions, but this usually results in the formation of high resistivity fly ash particles which are difficult to collect with an electrostatic precipitator. Recently a method has been developed for removal of $SO_2$ and $NO_x$ by irradiating the effluent gas with a high energy electron beam ($-1$ MeV) to produce excited chemically active species such as radicals which promote reactions that convert the $SO_2$ and $NO_x$ into particle or mist form, thereby enabling collection by the previously mentioned conventional particle collection methods. See, e.g., U.S. Pat. Nos. 4,004,995 and 4,435,260. This method is capital intensive since many electron beam accelerators are required, and the induced chemical reactions are limited to the radiation chemistry type. [B.D. Blaustein *Chemical Reactions in Electrical Discharges,* (Paper) No. 11, Advances in Chemistry Series (80), ACS, Washington, D.C., R. F. Gould, Ed. (1969)].

There are several methods of promoting chemical reactions in gases which are based on forming excited chemically active species in the gas. Many of these methods can be categorized as involving either ionizing radiations or electrical discharges. The ionizing radiation methods include the use of $\alpha$-rays, $\beta$-rays, $\gamma$-rays, ultraviolet light, X-rays, high energy electron beams, and the like. Electrical discharge chemical processes utilize several types of electrical discharges at low and high gas pressures [Blaustein, *Chemical Reactions in Electrical-Discharges,* Chapter (Paper No. 36), R. F. Gould, Ed. (1969)]. Low pressure electrical discharges include, e.g., electromagnetic field types such as radio-frequency, microwave, or laser induced discharges; and dc or ac glow discharges [Blaustein, *Chemical Reactions in Electrical Discharges,* Chapter (Paper) Nos. 22, 24, 29, 35; 21, 27; 3, 12; and also see J. L. Steinfeld, Ed. Laser-Induced Chemical Processes (1981), Plenum Press, New York]. High or atmospheric pressure electrical discharges include, e.g., dc or ac coronas, arc discharges, silent discharges, and streamer coronas.

The high pressure electrical discharges are well suited for promoting chemical reactions in processes at atmospheric pressure. A normal corona discharge is formed when dc or ac high voltage is applied to asymmetrical electrodes in a gas near atmospheric pressure, i.e., a point electrode at negative dc high voltage placed near a grounded plate electrode. The high voltage produces an electric field between the electrodes which is non-uniform and is strongest near the point, resulting in the breakdown of the gas near the point and the production of a corona glow [L. Loeb, *Electrical Coronas: Their Basic Physical Mechanism,* Univ. of Calif. Press (1965); Meek et al, Eds. *Electrical Breakdown of Gases* (1978); John Wiley & Sons, Ltd.]. An electrical current made up of ions and electrons flows between the elctrodes across the gap. In the region near the point the strong electric field imparts energy to the electrons. The electrons undergo elastic collisions with gas molecules, but do not lose significant energy because of the large difference in mass of the electrons and ions. Sufficiently energetic electrons can undergo inelastic collisions in which they transfer their energy to the gas molecules by raising the molecules to excited states. The molecules can release this energy by emitting light causing the characteristic glow of the corona discharge. The excited molecules can also involve themselves in chemical reactions or dissociate (forming radicals which are capable of promoting chemical reactions). The most energetic electrons ionize the molecules releasing more free electrons which also gain energy from the field and ionize additional molecules. This is commonly termed a Townsend avalanche and results in an exponential multiplication of the current. When the electrons leave the high field region (as they travel across the gap), they enter the low field region where they do not receive much energy from the field. These low energy electrons attach to molecules forming negative ions which then travel to the grounded plate. Ions gain energy from an electric field but, in contrast to electrons, lose their energy during elastic collision with gas molecules. The similar masses of the ions and molecules results in the transfer of kinetic energy from the ions to the molecules, thereby increasing the temperature of the gas. When ions collide with gas molecules they do not raise the molecules to excited states and, therefore, are incapable of promoting chemical reactions. Consequently, ion current does not contribute to the chemical reaction process, but wastes power heating the gas. Since the electrical current passing between the electrodes only contains electrons near the point, the production of excited molecules and radicals is limited to a small region near the point. Most of the current between the electrodes is ionic current, therefore the formation of excited molecules (active species) and radicals is power inefficient. Since the formation of active species only occurs in a small fraction of the interelectrode volume the formation rate is low and the volume efficiency is poor.

Recently experiments were conducted in Japan in which dc and ac corona discharges were used to remove $NO_x$ from a gas stream [Tamaki et al, The Chemical Society of Japan, Vol. 11, p. 1582 (1979)]. The power efficiency and removal rate, however, were found to be low. The use of a corona discharge for SO₂ and NO$_x$ removal has also been investigated. [K. Ootsuka, *Electrical Method of Integrated Pollution Control for Combustion Gases*, Ph.D. Dissertation, Dept. of Electrical Eng., Univ. of Tokyo, (1984)].

The arc discharges can also be used to promote chemical reactions [Blaustein, *Chemical Reactions in Electrical Discharges*, Chapter (Paper) No. 33, American Chemical Society Publications]. An arc discharge is very different, however, from the corona discharge. The arc consists of a narrow filament of high current connecting the two low voltage electrodes. (A corona discharge is low current and high voltage). The arc filament is heated to a very high temperature by the high current (e.g., an arc welder). Arc discharge chemistry is very power inefficient because of the high ion current and the power expended heating the gas. The treatment volume is also small due to the restricted volume of the single arc filament.

The silent corona discharge occurs when ac HV is applied across parallel or concentric electrodes separated by a dielectric layer (e.g., glass) and a small air gap ($-1$ mm). The resulting electric field is uniform across the gap, in contrast with the nonuniform electric field used to produce normal dc or ac coronas. The dielectric layer prevents sparkover from occurring and allows a diffuse uniform discharge to occur in the gap. The silent discharge can be used to promote gas phase chemical reactions. [Blaustein, *Chemical Reactions in Electrical Discharges*, Chapter (Paper) Nos. 17, 25, 26 and 28. American Chemical Society Publications].

One of the earliest applications of the silent discharge was the production of ozone [Rice et al, Handbook of Ozone Technology and Application, pp. 1-84 (1982); also U.S. Pat. Nos. 387,286 (1888) and 587,770 (1897)]. When dry air is passed through a silent discharge some of the O₂ molecules dissociate to O$^-$. Many of the O$^-$ atoms combine with O₂ molecules to form ozone (O₃). Improved silent discharge processes are among the best methods of producing ozone today. These processes use ac or high frequency ac (1-10 kHz) HV to produce the silent discharge; however, these processes are very power inefficient due to the ion current of discharge wasting power heating the gas. The waste heat is usually removed by liquid cooling of the electrodes [U.S. Pat. No. 3,766,051 (1973)]. The power efficiency of the process can be improved by limiting the ion current in the silent discharge by applying the proper voltage waveforms. [U.S. Pat. No. 4,016,060 (1977)].

When high voltage dc is applied across two plate electrodes in air very little current flows between the electrodes. As the voltage is increased a spark suddenly occurs between the plates (breakdown) which effectively "shorts" the plates, and then a large current flows which trips the power supply circuit breaker. High speed photography studies have shown that immediately before breakdown a streamer travels between the plates [L. B. Loeb, *Electrical Coronas: Their Basic Physical Mechanisms*, pp. 143, 167 (1965), Univ. of Calif. Press; Meek et al, Eds., *Electrical Breakdown of Gases*, p. 439 (1978), John Wiley & Sons, Ltd.]. The streamer is very short lived because it triggers the spark breakdown.

A stable streamer discharge can be formed by applying very short duration HV pulses (200 ns) to asymetrical electrodes. During the 200 ns that the HV is on, the streamers travel between the electrodes. There is not enough time for spark breakdown to occur before the voltage is off (between pulses) and the streamers disappear.

The pulses can be applied many times each second which results in a streamer corona discharge (a brush-like discharge consisting of many filamentary streamers) which can be used to promote chemical reactions. Most of the current in the streamer discharge is due to electrons because ions are about 500 times less mobile than electrons. This results in a high power efficiency since electron current can promote chemical reactions whereas an ion current cannot. The streamers travel across the entire interelectrode volume which results in a large formation rate of active species. The streamer corona discharge differs from the normal corona or silent corona discharges in the following respects.

(1) The active species producing region consists of brush-like streamers which travel across the entire electrode gap instead of consisting of a small glow region near the point elecrode or a uniform glow near the dielectric layer. Therefore, the active high electric field region at the streamer tip also travels across the entire gap.

(2) The streamer corona discharge has a large electron contribution to the current whereas the corona and silent corona discharges have a large ion current.

(3) The streamers are formed by very short pulses (200 ns) of HV whereas the corona and silent discharge are normally formed by constant or periodically varying HV.

The normal corona and silent corona discharges can be operated in a pulsed mode (usually pulses longer than 1 $\mu$s are used), but this should be distinguished from the streamer corona discharge because the actual physical mechanisms of the discharges are different.

A major application of normal corona discharges is electrostatic precipitation [H. White, *Industrial Electrostatic Precipitation*, Addison-Wesley, Pergamon Press, Oxford, 1963; also see S. Oglesby et al, *Electrostatic Precipitation*, Pollution Engineering and Technology Series, Ed. Young et al, Marcel-Dekker, N.Y. (1978)]. Electrostatic precipitators (hereinafter referred to as ESP) normally employ negative polarity dc corona discharges in wire-plate geometries for removing particulate matter from gas streams. The particles are charged and driven to the plate electrode where they form a layer which is rapped (vibrated) and falls into a hopper. Negative polarity is used because it usually results in better particle collection efficiencies than does positive polarity.

Pulsed negative coronas have also been employed in electrostatic precipitators [H. White, supra; U.S. Pat. Nos. 2,000,017; 2,509,548]. Operating the corona discharge in the pulsed mode enables the application of higher voltage without sparkover, results in a more uniform corona discharge along the wire surface, and lowers the ion current density in the interelectrode volume [H. Milde, IEEE Transactions on Electrical Insulation, Vol. E1-17, No. 2, p. 179, April 1982]. The lower current density helps prevent detrimental back corona from occurring by decreasing the voltage drop across the particle layer which is normally present on the collecting electrode. Back corona occurs when the voltage drop across this layer becomes large enough for breakdown of the layer, and releases particles and oppositely charged ions into the gas stream.

Pulsed corona discharges are different from streamer corona discharges. The streamer corona consists of many filamentary streamers which extend across the interelectrode volume, whereas the pulsed corona discharge is a uniform glow in the vicinity of one electrode.

Streamer corona discharges (negative polarity) have been employed in a Boxer Charger between closely spaced (20 mm) helical electrodes to generate a plasma from which negative ions are extracted by a high voltage AC potential. The extracted ions are then used to precharge particles before they enter an ESP [S. Masuda, A. Mizuno, et al, Conf. Rec. of IEEE/IAS, Annual Meeting, Philadelphia, Pa., pg. 1066 (1981)]. Masuda et al have also generated a plasma in the immediate volume enclosing the wire electrodes in an ESP using negative streamer coronas. A very uniform negative ion current is extracted from the plasma region into the interelectrode volume using negative polarity dc high voltage [Masuda et al, Conf. Rec. of IEEE/IAS Annual Meeting, Mexico City, p. 966 (October, 1983)].

Streamer corona discharges have also recently been employed in transmission line ozonizers to produce $O_3$ from dry oxygen. [S. Masuda et al, In: Conf. Rec. of IEEE/IAS, Annual Meeting, Chicago, Ill., p. 978 (Oct. 1984)]. Streamer corona discharges have also been used to promote chemical reactions which remove $SO_2$ from an airstream [A. Mizuno, J. S. Clements and R. H. Davis, In: Conf. Rec. of IEEE/IAS, Annual Meeting, Chicago, Ill., p. 1015 (October, 1984)]. In the system described therein a point to plane electrode geometry was used to promote the streamer corona discharge in air. High voltage pulses (45 kV peak, 200 ns duration) were applied to the point electrode with a repetition frequency of 60 times per second. The streamer corona discharge removed significant amounts of the $SO_2$ from an airstream containing 1500 ppm $SO_2$ and water vapor. The $SO_2$ removal of the system was compared with that of a high energy electron beam and a normal dc corona discharge. The streamer method was more power efficient than the other methods based on delivered power. Moreover, the streamer method formed a powder without the addition of additives (e.g., $NH_3$) which were required in other processes.

To date, the application of streamer corona discharge chemistry has been limited to the production of ozone in transmission line ozonizers, or the use of point or rod to plane geometries for the removal of sulfur dioxide from humid air.

It is an object of the present invention to provide an improved streamer corona discharge based method for removing sulfur dioxide and/or nitrogen oxides from mixtures thereof with other gases.

It is a further object of the invention to provide a streamer corona discharge based method for removing sulfur dioxide and/or nitrogen oxides, and/or particulate matter from mixtures thereof with other gases.

SUMMARY OF THE INVENTION

The present invention embodies four distinct concepts.

First, the invention is predicated on the discovery that the method of removing sulfur dioxide and/or nitrogen oxides in a streamer corona discharge zone is greatly improved by contacting the gas mixtures with the streamer corona discharge in a zone defined by electrodes spaced in a particular geometry.

Secondly, the invention is predicated on the discovery (1) that the removal of sulfur dioxide and/or nitrogen oxides may be accomplished by a streamer corona discharge zone defined by electrodes spaced in a particular geometry and (2) that the presence of particulate matter in the gas mixture has a synergistic effect on the degree of removal of the sulfur dioxide and/or nitrogen oxides components from the gas mixture.

Thirdly, the invention is predicated on the discovery that streamer corona generated by HV pulses superimposed on a HV dc bias is effective for the agglomeration and/or removal of high resistivity particles from a gas stream.

Fourthly, the invention is predicated on the discovery that streamer corona generated by positive HV pulses superimposed on a positive HV dc bias is effective for the simultaneous removal of $SO_2$, $NO_x$, and particulates from a gas stream.

According to one embodiment of the invention, there is provided an improved method for converting sulfur dioxide and/or nitrogen oxides in a mixture thereof with at least one other gas to separable forms, the method comprising:

passing the mixture of gasses through a streamer corona discharge zone defined by spaced electrodes;

periodically dissipating in the zone pulses of electrical power of sufficiently high voltage to establish therein a continuous pulsed streamer corona discharge whereby the sulfur dioxide and/or nitrogen oxides are converted to acid mist and/or particle aerosols;

wherein the improvement comprises establishing the streamer corona discharge in a zone defined by elecrodes spaced in a wire-cylinder or wire-plate geometry.

Optionally, a bias potential may also be established in the streamer corona discharge zone whereby ions formed during the streamer propagation are collected between pulses.

The aerosols may be removed from the gas mixture, if desired, according to any conventional method adapted therefor.

According to a further embodiment of the invention there is provided a method for converting sulfur dioxide and/or nitrogen oxides and/or particulate matter in a mixture thereof with at least one other gas to separable forms comprising:

passing the mixture of gases and particulate matter through a streamer corona discharge zone defined by discharge and collector electrodes spaced in a geometry comprising wire-cylinder or wire-plate, respectively;

(1) periodically dissipating in the zone pulses of electrical power of sufficiently high voltage to establish therein a continuous pulsed streamer corona discharge, and (2) establishing in the zone a high voltage bias potential whereby the sulfur dioxide and/or nitrogen oxides are converted to acid mist and/or particle aerosols and the aerosols and/or particulate matter are electrically charged and driven to and collected on the collector electrode.

BRIEF DESCRIPTION OF THE DRAWINGS

Preferred embodiments of the invention are described hereinbelow with special reference to the drawing in which.

DETAILED DESCRIPTION OF THE INVENTION

The present invention relates to a process which utilizes streamer corona to remove $SO_2$ and/or $NO_x$, and/or particulate matter from a gas stream.

One aspect of the present invention relates to an improvement in the Mizuno et al, supra, method of $SO_2$ removal. This aspect of the present invention is predicated on the discovery that the Mizuno et al process is unexpectedly and dramatically improved when a wire-cylinder or wire-plate geometry is substituted for the point (or rod) to plane geometry of the Mizuno et al discharge zone.

The present invention is further predicated on the discovery that particulate matter present in a gas mixture containing sulfur dioxide and/or nitrogen oxides has a synergistic effect on the removal of the latter gases from the mixture in a streamer corona discharge zone employing a wire-cylinder or a wire-plate geometry.

Another aspect of the present invention relates to a novel method for the utilization of a streamer corona discharge in a particular geometry to remove sulfur dioxide and/or nitrogen oxides and/or particulate matter from mixtures thereof with other gases.

Yet another aspect of the present invention relates to a novel method for the utilization of a streamer corona discharge in a particular geometry to agglomerate particulate matter suspended in a gas stream.

In the practice of the invention the gas stream is passed through a streamer corona discharge zone defined by spaced electrodes in a wire-cylinder (FIG. 1) or wire-plate (FIG. 2) geometry. The streamer corona is produced by grounding the cylinder or plate electrode and applying voltage to the wire electrode using power supplies capable of providing repetitive, fast-rising, narrow pulses of high voltage, preferably superimposed on a dc bias voltage, as shown in FIG. 3. The voltage could also be applied to the cylinder or plate electrode with the wire being grounded, but this is unsually inconvenient. The wire is electrically insulated from the cylinder or plate by use of conventional insulators, e.g., ceramic, etc. The standard practices of maximizing the surface path between electrodes along the insulator and keeping the insulator surface clean should be observed to prevent current flow or sparking along the insulator surface. If absolutely necessary, the value of the dc bias voltage can also be lowered to reduce insulator surface sparkover, since the problem is worse for dc voltage than for narrow pulses of voltage.

Figure 3:
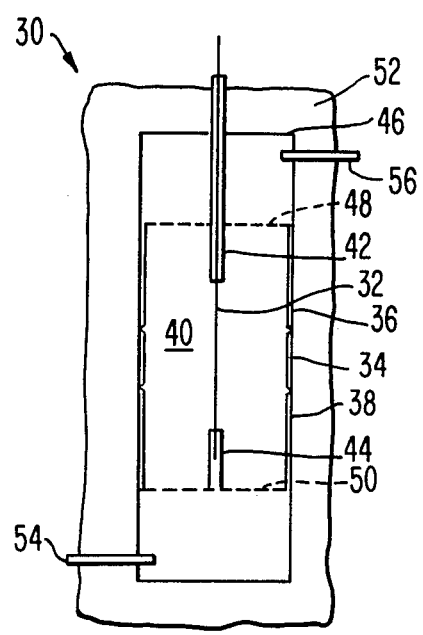
FIG. 3 depicts an idealized applied voltage waveform for producing the streamer corona discharge.
Figure 4:
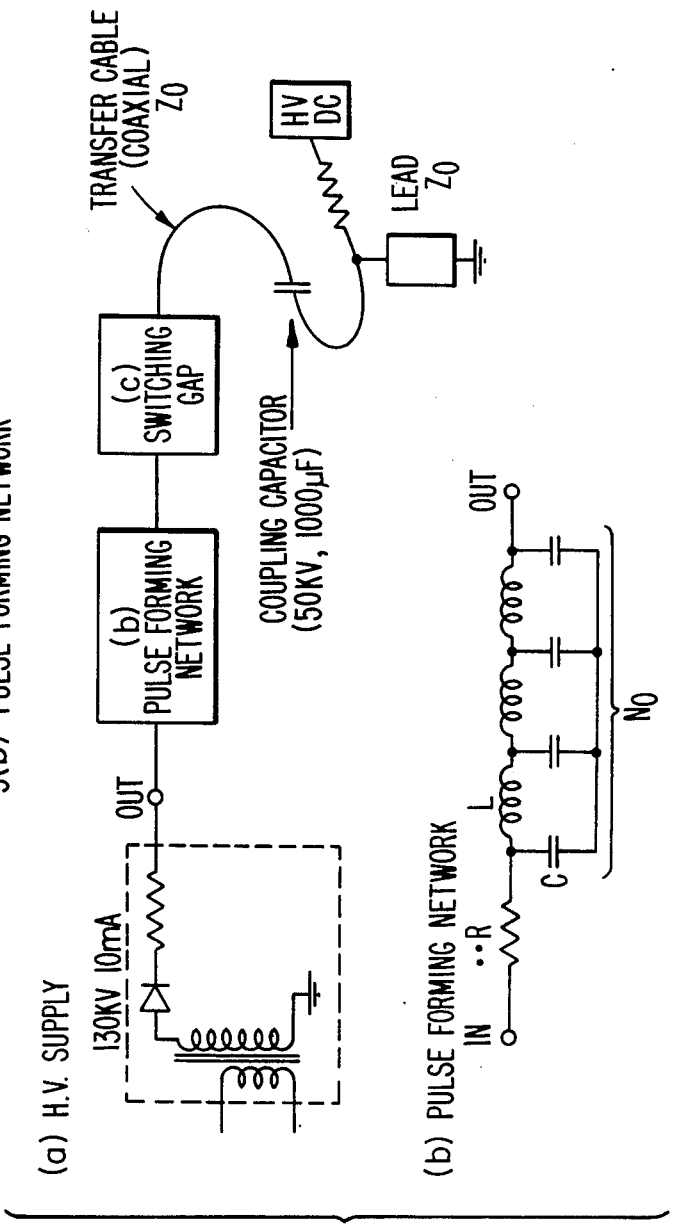
FIG. 4 is a schematic diagram of a power supply suitable to produce the streamer corona discharge.

A voltage waveform similar to that shown in FIG. 3 can be produced by a variety of methods. A convenient method is to use a HV pulse power supply and a HV dc power supply connected in parallel to the wire electrode with a HV capacitor connected in series with the pulsed power supply as shown in FIG. 4. The HV capacitor transmits narrow voltage pulses and blocks dc voltage, thereby isolating the dc voltage from the pulse power supply and allowing the HV pulses to be superimposed on the dc bias voltage. The HV pulses can be provided by a variety of well known high voltage power supplies which utilize high speed switch devices such as high speed mechanical switches (such as the rotary spark gap shown in FIG. 4), triggered spark gaps, thyrotrons, silicon controlled rectifiers and the like. The fastest switching (fast-rising, narrow pulses) can be achieved using spark gaps. For maximum power efficiency of the removal process, the most power efficient pulsed power supply enabling the use of the optimum pulse shape, rise time, height, width, and repetition frequency should be used. The aforementioned pulse parameters may be varied from the optimum values to enable the use of a more efficient type of power supply if this increases the overall efficiency (capital and operating) of the process.

The process can be operated in two modes. In the first mode (conversion) the gaseous $SO_2$ and/or $NO_x$ is converted to mist or particle form, but not collected. In the second mode (conversion and collection) the $SO_2$ and/or $NO_x$ is converted to mist or particle form and collected along with any other particulate matter present. The mode of operation is controlled by the level of dc bias voltage; i.e., a zero or small value of dc bias being used for the conversion mode and a high level of dc bias for the conversion and collection mode. An alternating polarity bias voltage can also be used for the conversion mode.

In both modes of operation the streamer corona are generated by the high voltage pulses. During each pulse many filamentary streamers propagate radially outward from the wire. The length of wire along which streamer corona can be generated is limited by the amount of energy contained in each pulse. Therefore, to treat large gas volumes several power supplies and sets of spaced electrodes may be required. For optimum performance the pulse rise time should be as fast as possible and the pulse peak voltage should be as high as possible without causing back corona or sparkover. If the pulse width is too wide the streamers contact the grounded electrode, and then the streamer channels form a conductive bridge between the electrodes which allows large ion currents to flow and sparkover occurs. Therefore, dc or ac HV is inappropriate for generating stable streamer corona. The optimum pulse width (depending on the pulse voltage, gas temperature and pressure, and electrode geometry) is long enough for streamer formation and propagation to occur but short enough so that the time the pulse is on is less than that required for either sparkover or a large ion current flow to occur. The delay time before streamer formation occurs decreases with increasing applied voltage and is the order of 1–100 ns. In air at room temperature and pressure, typical average streamer propagation velocities are the order of $10^8$ cm/sec, therefore under these conditions the time required for a streamer to travel 5 cm is the order of 50 ns (in addition to the delay time). [R. F. Fernsler, Phys. Fluids, Vol. 27, No. 4, p. 1005 (1984)].

The formation of chemically active species by the streamers is mainly due to inelastic collisions in which energetic electrons excite the gas molecules to excited states, thereby forming active species. During streamer propagation many electron avalanches occur in the high electric field region near the streamer tip. The electrons in this region gain sufficient energy from the field to excite the gas molecules, with the number of excited molecules increasing with the strength of the electric field. Streamers are particularly advantageous for producing extremely strong electric fields due to the conducting filamentary streamer channel forming a strong electric field at its tip and also due to the space charge enhancement of the field near the tip [Fernsler, supra.] The use of pulsed HV allows the application of higher voltages and therefore higher electric field strengths (without sparkover) as compared to dc HV.

Either positive or negative polarity HV pulses can be used with high power efficiency to generate streamer corona. However, the use of positive polarity pulses generates longer streamers than the use of negative polarity, and thereby utilizes more of the interelectrode volume resulting in a higher volume efficiency.

To increase the power efficiency in the conversion mode of the streamer corona process it is necessary to avoid driving ions because ion current does not contribute to the formation of excited, chemically active species. The use of very narrow pulses with a fast rise time is particularly advantageous for this purpose because the mobility of ions is 500 times less than that of electrons. During the short voltage pulse most of the current is due to electrons, with the slower ions remaining in the streamer channel. These leftover ions can be collected by the bias voltage between pulses so that they do not contribute to the ion current during the next pulse. To best accomplish this, the bias voltage and pulse repetition frequency should be adjusted so that the ions migrate to the electrodes before the next pulse occurs. The maximum time required for ion migration can be estimated using the well known relations, $t=d/v$, $v=bE$ and $E=V/d$ where $t=$time, $d=$electrode separation, $v=$average ion velocity, $b=$average ion mobility, $E=$the average electric field strength, and $V=$bias voltge.

The average ion mobility depends on the gas composition, pressure, and temperature, and is approximately 2 $cm^2$/volt-sec for air at normal temperature and pressure [S. Oglesby, supra, pp. 24, 35]. The pulse repetition frequency (f) should be low enough to allow the time required for ion migration between pulses; i.e., $f<1/t$, since the time consumed by the narrow pulses can usually be neglected. For example, at $V=5$, kV and $d=5$ cm then $E=1$ kV/cm, $v=2\times 10^3$ cm/sec and $t=2.5$ ms and $f<400$ Hz. The use of a larger dc bias voltage than the minimum required for ion collection wastes power driving the ions faster than necessary. However, increasing the dc bias decreases the ion collection time thereby increasing the permissible pulse repetition frequency which increases the treatment rate. Increasing the dc bias also raises the effective pulse voltage since the pulses are superimposed on the dc bias. Therefore, in the conversion mode, the optimum value of the dc bias may be higher than the minimum required for ion collection. If desired, the collection of particles due to the bias potential can be minimized by applying a bias potential which changes polarity synchronously with each application of a narrow high voltage pulse. The ions would be collected as before but the particle collection (due to the bias potential) would be reduced because the mobility of a typical charged particle is approximately 400 times less than that of ions [Oglesby, supra, p. 35].

For the conversion and collection mode of the process the dc bias should be large enough for effective particle charging and collection to occur between pulses. Particle charging occurs due to two well known mechanisms which involve contact of the ions with the particles: field charging and diffusion charging [S. Oglesby and G. Nicholas, *Electrostatic Precipitation,* Ch. 4, Marcel Dekker, N.Y.]. The charged particles are then driven to the grounded electrode by the electric field supplied by the dc bias voltage. Since many of the highly mobile electrons are removed during the narrow HV pulse leaving many positive ions, a positive polarity wire can be used to drive the positive ions and resulting positively charged particles to the grounded collecting electrodes. Since the field charging and collection of particles increases with electric field strength, a large dc bias voltage is most effective for particle charging and collection. However, the dc bias voltage should be lower than the dc corona onset voltage to prevent a continuous dc corona from occurring. A dc corona can cause "back corona" to occur when high resistivity particles are present and have formed a layer on the collecting electrode. Back corona results from a buildup of charge on the layer which causes a breakdown of the layer in which the particles are resuspended in the gas stream along with opposite polarity ions. Back corona results in a serious degradation of the particle collection efficiency because the resulting oppositely charged ions discharge the suspended particles which hinders their collection. [S. Olgesby and G. Nichols, supra, Ch. 7]. The use of positive streamer corona with a positive HV dc bias greatly reduces the back corona as compared to dc corona. The long positive streamers may actually discharge the particle layer and thereby prevent the buildup of charge that leads to back corona. However, if the pulse peak voltage, pulse width, or pulse repetition frequency are too high (depending on the fly ash resistivity), then back corona or sparkover can occur. In the usual mode of operation, the collected particles are removed by the conventional method of "rapping" (causing to vibrate by mechanically striking) the collecting electrode so that the particles fall into a hopper. If some reentrainment of clumps of particles from the layer to the gas stream occurs (possibly due to streamers striking the layer), then it may be advantageous to reduce the streamer length or to use a conventional ESP or bag house downstream to collect the agglomerated particles. The streamer corona device can also be easily retrofit to a conventional ESP by converting the first section of the ESP to a wire-plate geometry streamer corona device.

The process can also be operated in the agglomerator mode in which the particles in the layer are purposely reentrained into the gas stream by streamer action or turbulence, and then collected downstream by a conventional means, i.e., ESP or bag filter. Since the reentrained particulate matter consists of agglomerated particles from the layer on the electrode they have a large diameter. It is well known that large diameter particles are much easier to collect than small diameter particles, therefore the streamer corona agglomeration process could be used to enhance the particle collection efficiency of conventional devices.

Figure 1:
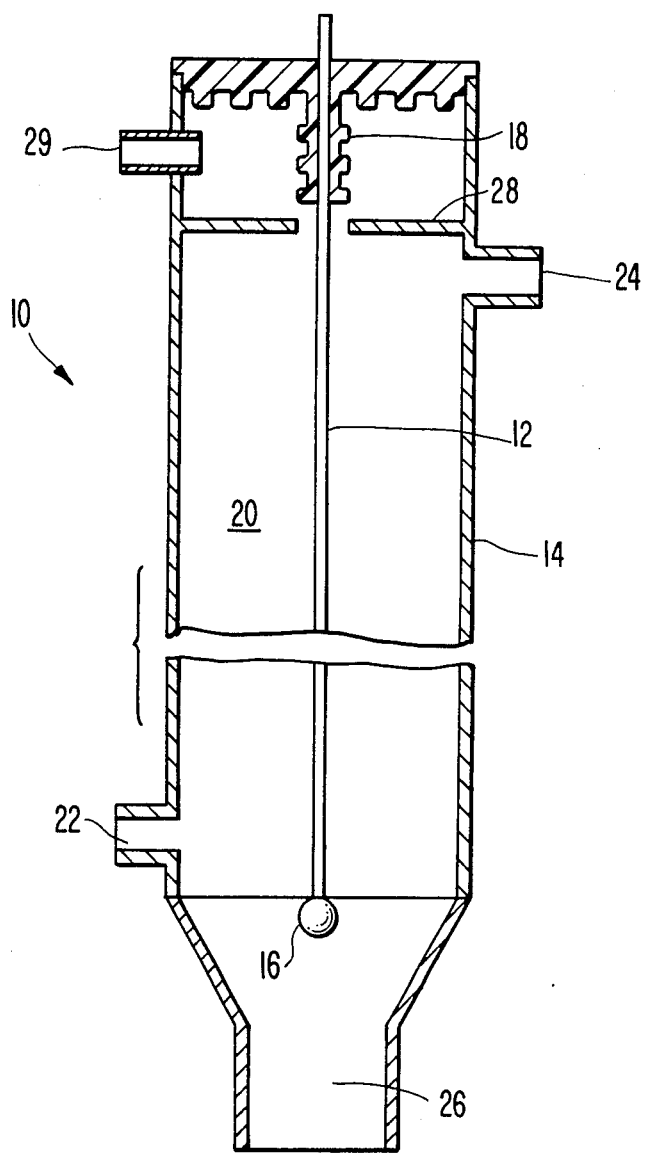
FIG. 1 is a cross-sectional view of a wire-cylinder apparatus suitable for the practice of the method of the invention.

Referring to FIG. 1, streamer corona rector 10 comprises discharge electrode wire 12 through which high voltage (pulse+dc) is conveyed and collecting electrode 14 which is grounded. A spherical weight 16 at the end of wire electrode 12 keeps the wire electrode 12 straight and reduces the local electric field strength to a value comparable to that at other locations along wire electrode 12. The discharge wire 12 is electrically insulated from the grounded collecting electrode 14 by insultor 18. The electrodes are arranged in the conventional wire-cylinder geometry depicted to form streamer corona discharge zone 20.

The gas whose components are to be separated enters the system via inlet 22 and, after passage through streamer corona discharge zone 20, exits the system via outlet 24. Gas components converted to mist or particle form and/or particles can be collected on electrode 14 which can be vibrated causing the material to fall into hopper 26. Nonconducting baffle 28 and purge air nozzle 29 are used to keep the surface of insulator 18 free from contamination by mists or particles.

Figure 2:
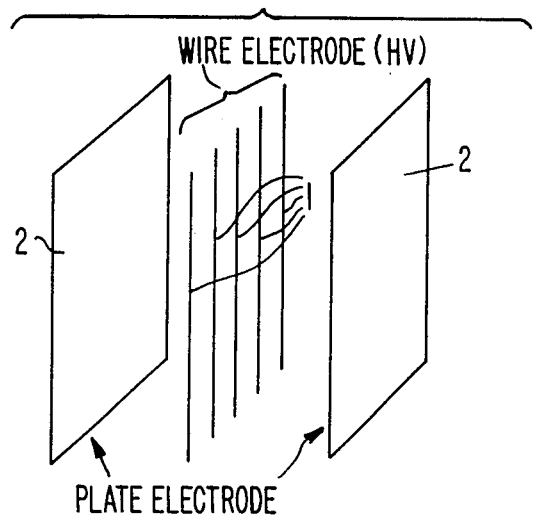
FIG. 2 depicts a wire-plate geometry suitable for the practice of the invention.

Referring to FIG. 2, a wire to plate geometry is depicted. Wire electrodes 1 are positioned between plate electrodes 2.

EXAMPLE 1

A pulsed streamer corona discharge in a wire-cylinder reactor was utilized to remove $SO_2$ from a humid air stream at various temperatures with and without the presence of fly ash. Referring to FIG. 3, streamer corona reactor 30 comprises discharge electrode wire 32 (diameter=3 mm) through which high voltage (pulse+dc bias) is conveyed and collecting cylindrical electrode consisting of probe electrode 34 (length=2.5 cm) and guard electrodes 36 and 38. The electrodes are made of stainless steel to prevent corrosion and are arranged in the conventional wire-cylinder geometry depicted to form streamer corona discharge zone 40. The discharge electrode 32 is housed in teflon insulation members 42 and 44 to further define the corona discharge zone 40 to a 5 or 10 cm length and said exposed section of wire electrode 32 was covered with braided cable (not shown) to increase the roughness of its surface and thereby simulate the effect of particles on the wire surface, i.e., a dirty wire. The entire cylindrical electrode system is housed in casing 46 constructed of PVC (polyvinyl chloride). The upper and lower ends, respectively, of the cylindrical electrode are covered with perforated plates 48 and 50 to provide a uniform gas flow through the discharge zone 40. The casing is shown as being housed in a thermally insulating jacket 52. The gas whose components are to be separated enters the system via inlet 54 and, after passage through streamer corona discharge zone 40, exits the system via outlet 56.

Air containing $SO_2$ (1000 ppm) and water vapor (2.5% by volume, i.e., 100% RH) was introduced into the reactor chamber at temperatures between 22° C. and 110° C. The $SO_2$ concentration of the gas exiting the chamber was measured using a dilution system and a pulsed fluorescent $SO_2$ analyzer. In some cases fly ash with a mean diameter of 5-10 $\mu$m was added to the gas stream using a fluidized bed.

Streamer corona were produced by applying voltage with the waveform depicted in FIG. 3 to discharge wire 32 and grounding cylinder electrode 36, 38. The current measuring electrode 34 at the center of the cylinder was grounded through a current measuring circuit which contained a capacitor to smooth the current pulses. Pulse voltage was generated using a capacitor bank and a rotating spark gas as depicted in FIG. 4 [Masuda et al, Conf. Rec. of IEEE/IAS Annual Meeting, Mexico City, Mexico, October 1983, p. 966]. A dc bias voltage can be superimposed on the pulse using a coupling capacitor. The output pulse voltage used in this experiment had a peak value range of +40 to +45 kV, a 200 ns width, and a 60 Hz repetition frequency.

Figure 6:
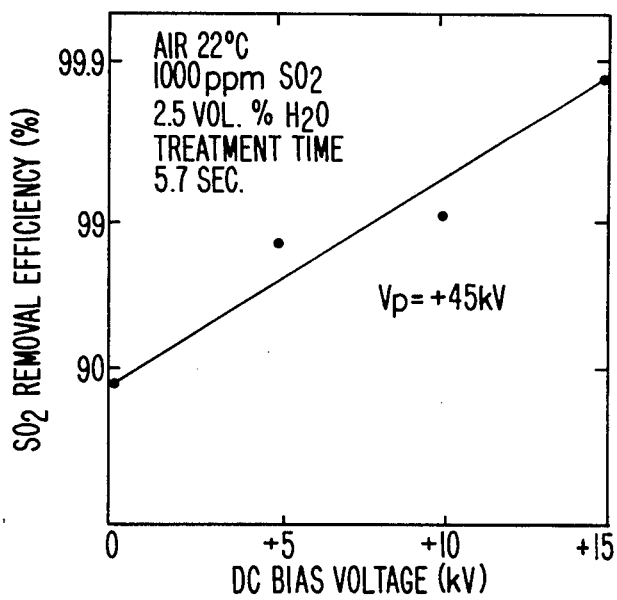
FIG. 6 depicts the sulfur dioxide removal efficiency of the method of the invention.

The $SO_2$ removal efficiency of the streamer corona reactor is shown in FIG. 6. A pulse of +45 kV peak voltage, 200 ns width, and 60 Hz repetition frequency was used with various values of dc bias voltage. The test gas containing 1000 ppm $SO_2$ and 2.5 vol % $H_2O$ was used at a temperature of 22° C. with a flow rate of 4.1 l/min. The exposed length of the discharge electrode was 5 cm. Since the starting point of the streamer corona is limited to the exposed metal surface of the wire electrode and the streamers do not significantly expand axially beyond the discharge origin, the length of the gas treatment volume is considered to be the same as that of the discharge electrode. Therefore, the gas treatment time is assumed to be 5.7 sec at a gas flow rate of 4.1 l/min. The $SO_2$ removal efficiency becomes higher at larger dc bias voltages. For a pulse voltage of +45 kV and a dc bias of 15 kV, the $SO_2$ removal was 99.8%. A white powder was observed covering the discharge electrode after operation of the reactor. The white powder and a mist condensation were also observed on the collecting electrode.

The $SO_2$ removal efficiency of the reactor at higher temperatures is tabulated in Table 1. A pulse with a peak voltage $V_p=+45$ kV was used with a dc bias of $V_{dc}=+10$ kV. The gas treatment time was 5.7 sec at 22° C., 4.8 sec at 80° C., and 4.4 sec at 110° C. The $SO_2$ removal efficiency decreases at higher temperatures. This is due to the shorter treatment time, and may also be due to an increase in the rate of back reactions in the $SO_2$ removal process.

In order to increase the $SO_2$ removal efficiency and promote the formation of solid products, additives (e.g., $NH_3$) can be added to the gas stream. The power requirement of the streamer corona reactor was smaller than that for the high energy electron beam process as reported by Mizuno et al, Conf. Rec. of IEEE/IAS, Annual Meeting, Chicago, Ill., p. 1015, October 1984.

TABLE 1

| SO$_2$ removal efficiency of the streamer corona reactor at high gas temperatures | | |
|---|---|---|
| Temperature (°C.) | SO$_2$ removal efficiency (%) | Gas Treatment time (sec) |
| 22 | 99 | 5.7 |
| 80 | 94 | 4.8 |
| 110 | 80 | 4.4 |

EXAMPLE 2

The following experiment was carried out to determine the effect of solid particulates on $SO_2$ removal.

The $SO_2$ removal efficiency of the streamer corona reactor was measured with and without the presence of suspended fly ash particles in the gas stream. A fly ash with a mean diameter of 5-10 $\mu$m was used at a dust concentration of 4 g/m$^3$. The procedure of Example 1 was conducted using a gas stream with 1000 ppm $SO_2$ and 2.5 vol % H$_2$O at room temperature (22° C). The gas treatment time was reduced to 3.2 sec for this comparison of the SO$_2$ removal efficiency with and without fly ash. A +45 kV pulse peak voltage with a +15 kV dc bias was used. The 55% SO$_2$ removal efficiency (45% penetration) was improved to 86% (14% penetration) by the presence of the fly ash particles. When the gas stream contains fly ash, then fly ash particles were observed on the collecting electrode (34, 36, 38) after operation of the reactor.

EXAMPLE 3

Figure 5:
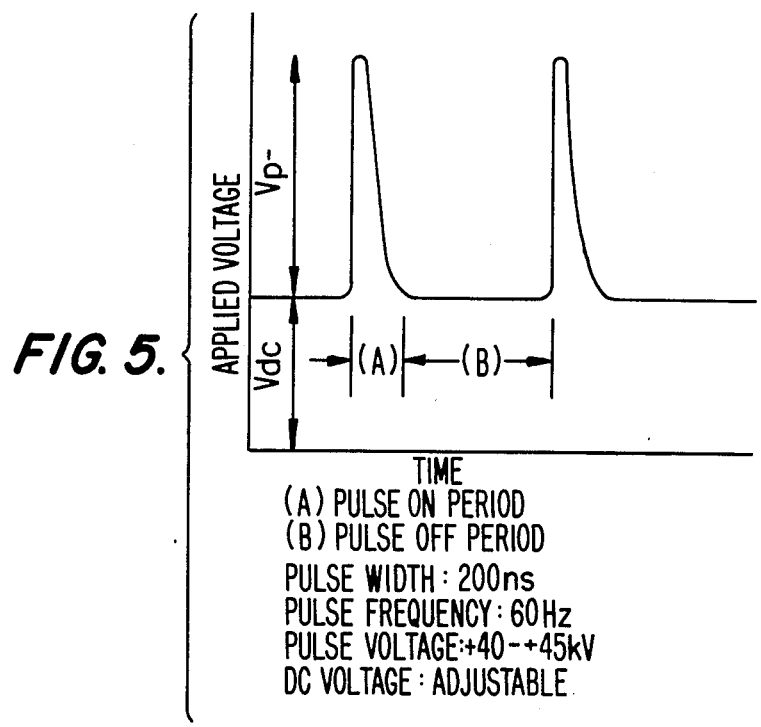
FIG. 5 is a cross-sectional view of a wire-cylinder streamer corona reactor used for the evaluation of the method of the invention.

A streamer corona discharge generated with narrow HV pulses superimposed on a HV dc bias was used to remove high resistivity fly ash particles from an air stream. In the procedure described below, the particle collection efficiency ($\eta_p$) of the wire-cylinder geometry streamer corona reactor 30 was mesured using fly ash. The reactor of Example 1 was operated with dc power only to simulate a conventional ESP and with narrow pulses superimposed on a dc bias (see FIG. 5) in the conversion and collection mode of the rector. The collection efficiency was measured using fly ash particles with the collecting electrode 34, 36, 38 covered with a high resistivity layer of 1 mm thick filter paper to simulate a layer of collected high resistivity fly ash. The fractional particle collection efficiency of the reactor was also determined using an optical particle counter. The charge-to-radius distribution of the particles exiting the reactor was also measured.

The exposed length of discharge electrode 32 was 10 cm and the gas treatment time was 3.9 sec. Dry air at 22° C. was used at a flow rate of 12.0 l/min with an initial fly ash concentration of 4 g/m$^3$. The fly ash was added using a fluidized bed and the mean diameter was 5–10 $\mu$m. The fly ash resistivity was high (10$^{13}$ ohm-cm) under these conditions. The final fly ash concentration was measured at the exhaust of the chamber. The fly ash removal efficiency was determined from the ratio of the fly ash concentrations with and without the voltage application, so that mechanical collection was not included in the determination of removal efficiency.

Figure 7:
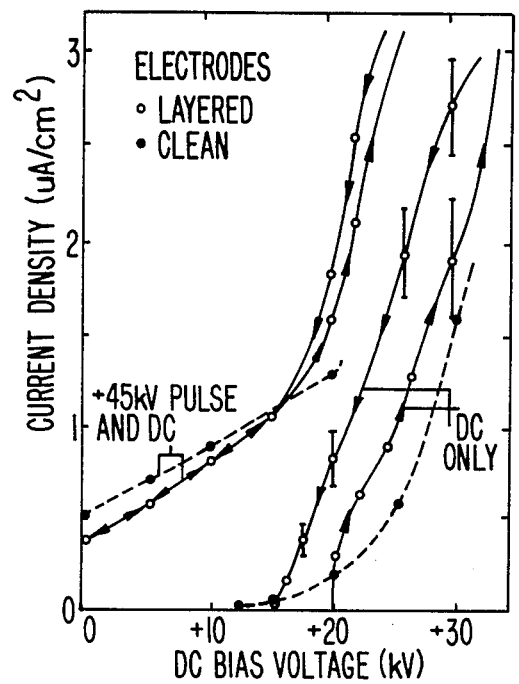
FIG. 7 depicts the voltage-current characteristics of the streamer corona and dc corona discharges in the wire-cylinder geometry.

The voltage-current characteristics of the wire-cylinder reactor 30 are shown in FIG. 7. When dc high voltage was applied to discharge wire 32 to simulate a conventional ESP with dc operation, a large current increase and the typical hysteresis due to intense back corona were observed. When the dc voltage was raised, the dc corona started at +20 kV and back corona took place immediately. The current increased very rapidly. Then the dc voltage was decreased, and the current was quenched at +15 kV. FIG. 7 also shows the V-I characteristics using the pulse (V$_p$=45 kV) and a dc bias voltage (conversion and collection mode). Below V$_{dc}$=+15 kV, a large current increase was not observed, suggesting that no back corona took place. Above V$_{dc}$=+15 kV, the current increased rapidly and the hysteresis due to back corona was observed.

The particle collection efficiency was measured using pulse voltage with a +15 kV dc bias voltage, so that a back corona free condition was achieved in the period between the pulses. The collection efficiency (shown in Table 2) was obtained from the difference in weight (gained by a filter sampling fly ash at the exhaust) with the voltage on and off. The collection efficiency using only dc power (+25 kV) was also measured. A 50% collection efficiency (50% penetration) was achieved using the pulse and dc bias voltage, while for the dc only operation the collection efficiency was 7% (93% penetration). The lower collection efficiency in the dc only operation (with severe back corona) is plausible since mechanical collection was not included in the efficiency calculation.

TABLE 2

| | Fly ash collection efficiency | |
|---|---|---|
| Condition | Penetration (fly ash concentration) (g/m$^3$) | Collection efficiency (%) |
| No voltage | 1.88 | 0 |
| PULSE + DC Bias | | 50 |
| V$_p$ = +45 kV | 0.94 | |
| V$_{dc}$ = +15 kV | | |
| J = 1.0 $\mu$A/m$^2$ | | |
| DC only | | |
| V$_{dc}$ = +25 kV | 1.75 | 7 |
| J = 1.0 $\mu$A/m$^2$ | | |

V$_p$: pulse peak voltage
V$_{dc}$: dc bias voltage
J: current density

The fractional penetration of fly ash particles was also measured under the same conditions using an optical particle counter (see Table 3). The penetration of the smaller particles (<5 $\mu$m diameter) decreased to less than 10%, while that of the larger diameter particles increased. The increase in the penetration of the larger particles suggests an agglomeration of particles due to reentrainment. The penetration of particles occurred in the 3–5 $\mu$m range for the pulse with the dc bias operation was about ½ that for the dc only operation. In the pulse with dc bias operation, reentrainment can result from streamers hitting the dust layer during each pulse period. In the dc only operation, reentrainment occurs because of back corona.

TABLE 3

| | Fractional penetration of fly ash | |
|---|---|---|
| Fly ash | Penetration (%) | |
| diameter range ($\mu$m) | DC only V$_{dc}$ = +25 kV | PULSE and DC VP = +45 kV V$_{dc}$ = 15 kV |
| 2–3 | 7 | 7 |
| 3–5 | 10 | 6 |
| 5–10 | 25 | 17 |
| >10 | 100 | 400 |

Figure 8:
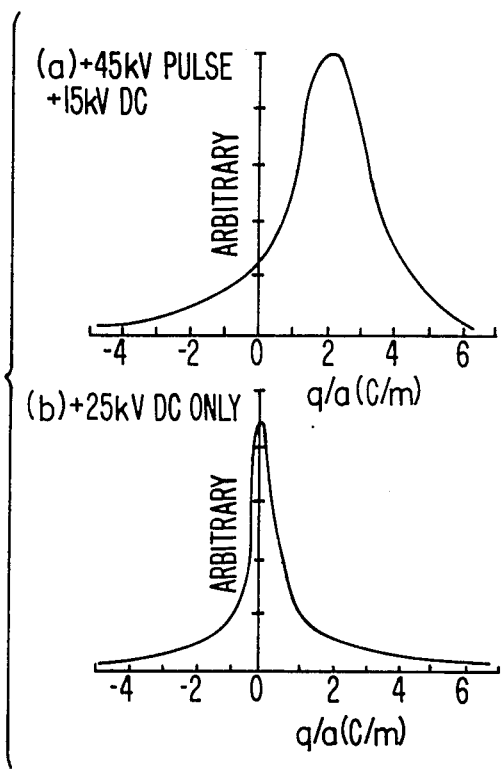
FIG. 8 depicts the charge-to-radius ratio distribution of suspended fly ash particles being removed from gas mixtures according to the method of the invention, and also depicts the charge-to-radius ratio distribution of suspended fly ash particles being removed from gas mixtures using a dc corona discharge.

The charge-to-radius ratio (q/a) of the fly ash particles was also measured according to the method of Mizuno et al [Conf. Rec. of IEEE/IAS, Annual Meeting, San Francisco, Calif., October 1982, p. 1111]. A sampling tube was inserted into the reactor with the sampling point 2 mm above the measuring electrode 34. The q/a distribution of a sample of 50 particles (approximately 1 $\mu$m diameter) is shown in FIG. 8. In the pulse with dc bias operation the 1 $\mu$m diameter particles were charged monopolarily, while in the dc only operation the particles were charged with both polarities and many neutral particles were observed. The q/a of the larger particles was small in both operations, suggesting that reentrainment had occurred.

The above described examples demonstrate that a streamer corona discharge in a wire-cylinder device is very effective for the removal of SO$_2$ and/or fly ash particles from a gas stream and that the presence of fly ash particles has a synergistic effect on the SO$_2$ removal. The SO$_2$ removal performance of the wire-cylinder device is substantially superior to that of the point or rod to plane device, as can be seen in the following comparison. The wire-cylinder device removed 99.8% of the $SO_2$ at a treatment time of 5.7 seconds and applied voltage of VP=+45 kV, $V_{dc}$=15 kV, as shown in FIG. 6. At an applied voltage of $V_p$=+45 kV, $V_{dc}$=+20 kV and with a slightly longer treatment time (6.7 seconds), the best $SO_2$ removal obtained with the rod-plane and point-plane devices is respectively, 85% and 94% [Mizuno et al, supra]. Since the $SO_2$ removal is an expoential process, an improvement in removal performance from 90 to 99% is equivalent to an improvement from 0 to 90% or 99 to 99.9%. Therefore, the 99.8% removal using the wire-cylinder discharge is substantially better than the 94% obtained with the rod to plane discharge, and in addition using the wire-cylinder discharge for $SO_2$ removal required less voltage and treatment time.

Using short duration voltage pulses allows a very high electric field to be established without sparkover, and results in the formation of more intense and uniform streamers. Using positive polarity instead of negative causes the streamers to reach out farther to cover a larger volume. The pulsed streamer corona discharge is very power efficient since most of the current is formed by electron migration and the power loss due to ion current during the pulse and due to collecting the ions between pulses is small. Using a pulse voltage superimposed on dc bias results in a higher peak voltage which increases the streamer intensity. Therefore, the appropriate dc bias level is determined by optimizing the overall performance taking into account the power wasted by dc driven ions. Using narrow positive HV pulses superimposed on a positive HV dc bias voltage resulted in the removal of $SO_2$ and the collection of suspended fly ash particles in the gas stream. The dc bias voltage is set at a value less than the dc corona starting voltage to prevent back corona when the dust resistivity is very high.

The present invention provides a streamer corona based method which removes $SO_2$ and/or $NO_x$ and high resistivity dust from gas streams in a combined treatment by one device and is superior to known methods for removing $SO_2$ and $NO_x$ alone from gas mixtures. The success of the invention is predicated on the unexpected discovery that the wire to cylinder and wire to plate geometries of the spaced electrodes in the device gives rise to $SO_2$ removal results not obtainable with point or rod to plane geometries, and on the unanticipated superior combined collection of $SO_2$, $NO_x$ and high resistivity fly ash particles by the dc biased streamer corona.

The method of the invention can remove more than 90% of the $SO_2$ and $NO_x$ from a gas stream, and the removal efficiency is improved by the presence of fly ash particles in the gas stream. Moreover, the collection efficiency of fly ash particles by the device is significantly higher than that by a dc powered precipitator when the collecting electrode is covered with a high resistivity layer.

The method and system of the invention are applicable for the removal of the above-described impurities from their admixtures with any gaseous components but is especially adapted for removal thereof from air, stack gases, exhaust gases, etc.

It will be understood that by the phrase "wire-cylinder geometry" is meant any of the known and conventional spaced electrode geometries for producing corona discharges wherein a discharge wire electrode is positioned with a cylindrical electrode, e.g., wherein the wire electrode is coaxially disposed or positioned within the cylindrical electrode. It will also be understood by the phrase "wire-plate" geometry is meant any of the known and conventional spaced electrode geometries for producing corona discharge wherein a row of discharge wires is disposed between parallel plates. See Oglesby et al, *Electrostatic Precipitation*, Ch. 3, *Pollution Engineering and Technology*, Ed. Young et al, Marcel Dekker, N.Y. and Basel (1978), pp. 32,36,.

The method may be carried out using one or more wire-cylinder electrodes with the diameter of the cylindrical electrode (depending on the volume of gas flow) preferably in the range of from about 1 cm to about 1 meter and with the diameter of the wire electrode in the range of from about 0.1 mm to about 5 cm, depending on the applied voltage.

The method may also be carried out using one or more wire-plate electrodes (depending on the volume of gas flow) with the plate separation in the range of from about 1 cm to about 1 m, with the wire to wire spacing from about 1 mm to about 30 cm, and with the diameter of the wire electrode from about 0.1 mm to about 5 cm, depending on the applied voltage. The system is operated by applying positive or negative voltage consisting of fast rising, narrow pulses optionally superimposed on a bias voltage, where the pulse voltage is in the range of from about 1 kV, to about 500 kV and the pulse repetition frequency is in the range of from about 1 Hz to 10 kHz, depending on the pulse width and bias voltage. The rise time of said narrow pulses should be as fast as possible, preferably in the range of from about 100 V/ns to about 100 kV/ns.

The width of said narrow pulses is sufficiently long for streamers to form and propagate but less than the time required for sparkover to occur due to streamers forming a conductive channel between electrodes, i.e., in the range of from about 10 ns to about 10 $\mu$s, depending on the electrode separation and the applied voltage.

Where the method is used for conversion of $SO_2$ and/or $NO_x$ only without particle collection, the bias voltage is equal to or greater than the value necessary to collect the ions in the interelectrode volume during the period between pulses; i.e., from about 100 V to about 100 kV, depending on the electrode separation, pulse repetition frequency, and pulse width.

Where the method is used for collection of particles and/or $SO_2$ and $NO_x$, the level of the dc bias voltage is less than that required to produce back corona but of sufficient magnitude to result in the charging and collecting of particles from the interelectrode volume, i.e., from about 1 kV to 200 kV, depending on the particle resistivity, dc corona onset voltage, and electrode separation.

It will be understood by those skilled in the art that by the term "wire", as used herein, is meant any of the known and conventional wire electrodes used for producing corona discharges including wires of various cross-sectional shapes such as circular, elliptical, square, rectangular, narrow strip, star pattern and the like.

We claim:

1. A method for converting sulfur dioxide and/or nitrogen oxides in a mixture thereof with at least one other gas to separable forms comprising:

passing said mixture of gass through a streamer corona discharge zone defined by spaced electrodes; periodically dissipating in said zone pulses of electrical power of sufficiently high voltage to establish therein a continuous pulsed streamer corona discharge whereby the sulfur dioxide and/or nitrogen oxides are converted to acid mist and/or particle aerosols;

the improvement comprising establishing a streamer corona discharge by applying fast-rising narrow pulses in a zone defined by electrodes spaced in a wire-cylinder or wire-plate geometry.

2. The of claim 1 including the step of separating said aerosols from said mixture.

3. The method of claim 1 wherein said at least one other gas is air.

4. The method of claim 1 wherein said mixture of gases is a stack gas.

5. The method of claim 1 wherein said mixture of gases is effluent from an industrial process.

6. The method of claim 1 wherein said mixture of gases is exhaust from an internal combustion engine.

7. The method of claim 1 wherein said wire-cylinder geometry comprises a wire discharge electrode coaxially disposed within a cylindrical electrode.

8. The method of claim 7 wherein the diameter of said wire electrode is in the range of from about 0.1 mm to about 5 cm, and the diameter of said cylinder is in the range of from about 1 cm to about 1 m.

9. The method of claim 1 wherein said wire-plate geometry comprises a row of parallel wire discharge electrodes disposed between parallel plate electrodes.

10. The method of claim 9 wherein the diameter of said wire discharge electrodes is in the range of from about 0.1 mm to 5 cm, and where the wire to wire separation is in the range of from about 1 mm to about 30 cm, and where the parallel plate electrode separation is in the range of from about 1 cm to about 1 m.

11. The method of claim 1 wherein said power has a pulse repetition frequency in the range of from about 1 Hz to about 10 kHz.

12. The method of claim 1 wherein said pulses have a peak voltage in the range of from about 1 kV to about 500 kV.

13. The method of claim 1 wherein said narrow pulses have a width in the range of from about 10 ns to about 10 $\mu$s, and rise time in the range of from about 100 V/ns to about 100 kV/ns.

14. The method of claim 1 wherein said narrow pulses are of the same polarity.

15. The method of claim 1 wherein said polarity is positive.

16. The method of claim 1 wherein said polarity is negative.

17. The method of claim 1 wherein a bias potential is maintained across said zone, said voltage being less than that required to produce back corona or sparkover and of sufficient magnitude to remove gas ions from said zone.

18. The method of claim 17 wherein the polarity of said bias potential voltage is changed synchronously with each dissipation of a pulse.

19. The method of claim 17 wherein said bias potential voltage is in the range of from about 100 V to about 100 kV.

20. The method of claim 17 wherein said bias potential voltage is dc voltage of the same polarity as the pulses.

21. The method of claim 17 wherein said bias potential voltage is dc voltage of the opposite polarity as the pulses.

22. The method of claim 17 wherein said bias potential voltage is ac voltage.

23. The method of claim 1 wherein at least one additive is added to the gas mixture.

24. The method of claim 23 wherein said additive is particulate matter.

25. The method of claim 23 wherein said additive is particulate matter.

26. The method of claim 23 wherein said particulate matter is lime (CaO) or limestone ($CaCO_3$).

27. A method for converting sulfur dioxide and/or nitrogen oxides and/or particulate matter in a mixture thereof with at least one other gas to separable forms comprising:

passing said mixture of gases and/or particulate matter through a streamer corona discharge zone defined by discharge and collector electrodes spaced in a geometry comprising wire-cylinder or wire-plate, respectively;

(1) periodically dissipating in said zone pulses of electrical power of sufficiently high voltage to establish therein a continuous pulsed streamer corona discharge and (2) establishing in the zone a high voltage bias potential; whereby the sulfur dioxide and/or nitrogen oxide are converted to acid mist and/or particle aerosols; and the aerosols and/or particulate matter is electrically charged and driven to and collected on the collection electrode.

28. The method of claim 27 wherein said cylindrical collector electrode has a high resistivity layer on or adjacent to its interior surface.

29. The method of claim 27 wherein said at least one other gas is air.

30. The method of claim 27 wherein said mixture of gases is a stack gas.

31. The method of claim 27 wherein said particulate matter is fly ash.

32. The method of claim 27 wherein said wire-cylinder geometry comprises a wire discharge electrode coaxially disposed within a cylindrical electrode.

33. The method of claim 32 wherein the diameter of said wire electrode is in the range of from about 0.1 mm to about 5 cm, and the diameter of said cylinder is in the range of from about 1 cm to 1 m.

34. The method of claim 27 wherein said wire-plate geometry comprises a row of parallel wire discharge electrodes disposed between parallel plate electrodes.

35. The method of claim 34 wherein the diameter of said wire discharge electrodes is in the range of from about 0.1 mm to 5 cm, and where the wire to wire separation is in the range of from about 1 mm to, about 30 cm and where the parallel plate electrode separation is in the range of from about 1 cm to about 1 m.

36. The method of claim 27 wherein said power has pulse repetition frequency in the range of from about 1 Hz to about 10 kHz.

37. The method of claim 27 wherein said narrow pulses have a peak voltage in the range of from 1 kV to about 500 kV.

38. The method of claim 27 wherein said narrow pulses have a width in the range of from about 1 ns to about 10 us, and a rise time in the range from about 100 V/ns to about 100 kV/ns.

39. The method of claim 27 wherein said narrow pulses are of the same polarity.

40. The method of claim 39 wherein said polarity is positive.

41. The method of claim 27 wherein said high voltage bias potential is less than that required to produce back corona and of sufficient magnitude to charge and remove particles from said zone.

42. The method of claim 41 wherein said high voltage bias potential is in the range of from about 1 kV to about 100 kV.

43. The method of claim 42 wherein said high bias potential voltage is dc voltage of the same polarity as the narrow pulses.

44. The method of claim 27 wherein said aerosols and/or particles are not removed from said mixture of gases but are agglomerated.

45. The method of claim 27 wherein at least one additive is added to the gas mixture.

46. The method of claim 45 wherein said additive is ammonia ($NH_3$) or water vapor.

47. The method of claim 45 wherein said additive is particulate matter.

48. The method of claim 49 wherein said particulate matter is lime (CaO) or limestone ($CaCO_3$).

49. The method of claim 27 wherein the polarity of said bias potential voltage is changed synchronously with each dissipation of a pulse.

* * * * *